(12) United States Patent
Dahan

(10) Patent No.: US 12,130,857 B2
(45) Date of Patent: Oct. 29, 2024

(54) METHOD AND SYSTEM FOR EDITORIALIZING DIGITAL AUDIOVISUAL OR AUDIO RECORDING CONTENT OF AN ORAL PRESENTATION

(71) Applicant: VERNSTHER, Paris (FR)

(72) Inventor: Jennifer Dahan, Paris (FR)

(73) Assignee: VERNSTHER, Paris (FR)

(*) Notice: Subject to any disclaimer, the term of this patent is extended or adjusted under 35 U.S.C. 154(b) by 341 days.

(21) Appl. No.: 17/754,002

(22) PCT Filed: Sep. 18, 2020

(86) PCT No.: PCT/FR2020/051612
§ 371 (c)(1),
(2) Date: Mar. 21, 2022

(87) PCT Pub. No.: WO2021/053302
PCT Pub. Date: Mar. 25, 2021

(65) Prior Publication Data
US 2022/0342924 A1    Oct. 27, 2022

(30) Foreign Application Priority Data
Sep. 19, 2019 (FR) ..................... 1910334

(51) Int. Cl.
*G06F 16/41* (2019.01)
*G06F 16/40* (2019.01)
(Continued)

(52) U.S. Cl.
CPC .............. *G06F 16/41* (2019.01); *G06F 16/40* (2019.01); *G06F 16/685* (2019.01);
(Continued)

(58) Field of Classification Search
CPC ......... G10L 15/26; G10L 15/22; G06F 16/41; G06F 16/40; G06F 16/685; G06F 16/7867
See application file for complete search history.

(56) References Cited

U.S. PATENT DOCUMENTS 6,185,538 B1 * 2/2001 Schulz ................. G11B 27/034
704/235
6,237,025 B1 * 5/2001 Ludwig ............... H04L 12/1822
709/204
(Continued)

FOREIGN PATENT DOCUMENTS

EP    1582067 B1    9/2015
FR    2849564 B1    4/2005
(Continued)

OTHER PUBLICATIONS

Anonymous: "Editorialisation"—Wikipedia, https://fr.wikipedia.org/w/index.php?title=Editorialisation&oldid=160067824, Jun. 12, 2019, 13 pages.
(Continued)

*Primary Examiner* — Samuel G Neway
(74) *Attorney, Agent, or Firm* — TraskBritt

(57) ABSTRACT

Method for editorializing digital audiovisual or audio recording content of an oral presentation given by a speaker using a presentation support enriched with tags and recorded in the form of a digital audiovisual file. This method comprises written transcription of the oral presentation with indication of a time code for each word, comparative automatic analysis of this written transcription and of the tagged presentation support, transposition of the time codes from the written transcription to the tagged presentation support, identification of the tags and of the time codes of the presentation support, and marking of the digital audiovisual
(Continued)

file with the tags and time codes, so as to generate an enriched digital audiovisual file.

27 Claims, 11 Drawing Sheets

(51) Int. Cl.
    *G06F 16/683*      (2019.01)
    *G06F 16/78*      (2019.01)
    *G06F 21/16*      (2013.01)
    *G10L 15/22*      (2006.01)
    *G10L 15/26*      (2006.01)

(52) U.S. Cl.
    CPC .......... *G06F 16/7867* (2019.01); *G06F 21/16* (2013.01); *G10L 15/22* (2013.01); *G10L 15/26* (2013.01)

(56) References Cited

U.S. PATENT DOCUMENTS

| | | | | |
|---|---|---|---|---|
| 6,272,461 | B1* | 8/2001 | Meredith | G10L 21/06 704/235 |
| 2001/0025241 | A1* | 9/2001 | Lange | G10L 15/26 704/235 |
| 2003/0086409 | A1* | 5/2003 | Karas | H04N 21/84 725/135 |
| 2005/0044480 | A1* | 2/2005 | Dahan Templier | G06F 16/4393 715/204 |
| 2008/0082581 | A1* | 4/2008 | Templier | G06F 16/4393 |
| 2012/0236201 | A1* | 9/2012 | Larsen | G06Q 30/02 348/468 |
| 2022/0342924 | A1* | 10/2022 | Dahan | G06F 21/16 |

FOREIGN PATENT DOCUMENTS

| | | |
|---|---|---|
| FR | 2878345 B1 | 4/2008 |
| FR | 2910987 B1 | 5/2009 |
| WO | 2006/053993 A2 | 5/2006 |

OTHER PUBLICATIONS

Eric: YouTube ajoute le sous-titrage et la traduction automatique des videos, https://www.presse-citron.net/youtube-ajoute-le-sous-titrage-et-la-traduction-automatique-des-videos/, Feb. 2, 2022, 2 pages.

International Search Report for International Application No. PCT/FR2020/051612 dated Mar. 3, 2021, 4 pages.

International Written Opinion for International Application No. PCT/FR2020/051612 dated Mar. 3, 2021, 8 pages.

* cited by examiner

METHOD AND SYSTEM FOR EDITORIALIZING DIGITAL AUDIOVISUAL OR AUDIO RECORDING CONTENT OF AN ORAL PRESENTATION

CROSS-REFERENCE TO RELATED APPLICATIONS

This application is a national phase entry under 35 U.S.C. § 371 of International Patent Application PCT/FR2020/051612, filed Sep. 18, 2020, designating the United States of America and published as International Patent Publication WO 2021/053302 A1 on Mar. 25, 2021, which claims the benefit under Article 8 of the Patent Cooperation Treaty to French Patent Application Serial No. 1910334, filed Sep. 19, 2019.

TECHNICAL FIELD

The present disclosure relates to a method for editorializing digital orality, the objective of which is to improve the professional and contextual exploitation of the contents of digital audio and audiovisual recordings of Knowledge and Communication. It also relates to an editorializing system implementing this method.

BACKGROUND

It has been observed that alongside the exponential growth of online video content, the viewing of this content remains linear and "monobloc." The indexing of video content consists of a list of keywords attached to the video file. The narrative account of course videos, conference trainings, etc. strictly speaking is not tagged and even less so according to its meaning; at best, it is roughly sequenced.

Thus, during an online search for video content on a particular theme, the results lead to having to consult complete videos that range from a few minutes to several hours. This observation de facto excludes routine and operational use in a work context.

Document EP1582067B1 discloses a method for producing a multimedia publication based on oral presentations, starting, on the one hand, from information contained in a previously recorded audio and/or video flow, and on the other hand, supplementary data or information and reference documents associated with the audio and/or video information, comprising both an indexing of the audio and/or video flow, from its structure, and an indexing of the supplementary data or information and reference documents, so that the supplementary data and reference documents are displayable parallel to the audio and/or video flow on a display apparatus, characterized in that it further comprises provision of a plurality of modes of presentation of the audio and/or video flow and/or of the associated supplementary data or information and reference documents, each mode of presentation resulting from a specific combination of the indexing of the audio and/or video flow and the indexing of the associated supplementary data or information and reference documents and in that the information contained in the previously recorded audio and/or video flow and the reference documents and associated data are organized within an information structure, which has the character of a matrix with on the one hand a time axis of the video and on the other hand several types of data, this information structure being centered on the reference documents, these reference documents allowing access to both (i) relevant audio and/or video sequences via the indexing of the audio and/or video flow and (ii) the entirety of the reference documents via the indexing of these documents.

Document FR2910987A discloses a method for building a knowledge database from products for publishing oral presentations integrating a previously recorded audio and/or video flow with which additional data and reference documents are associated that are listed chronologically and indexed in synchronism with the oral flow by means of synchronization data providing selective access to fragments within the audio and/or video flow. This method comprises:
 collecting the synchronization for each publishing product,
 aggregating the previously collected synchronization data so as to generate global synchronization data for all the publishing products, and
 generating a graphical interface for selective search within the knowledge database so as to enter search instructions.

The global synchronization data are organized to supply a search engine designed to process the search instructions.

Document WO2006/053993A2 discloses a method for providing training in the use of a software application on information and/or communication equipment, this software application generating a graphical user interface displayed on a display member of the information and/or communication equipment, this graphical user interface comprising:
 a specific graphic frame of the application including selection areas, such as selection icons and/or tabs, and a content area, characterized in that it comprises generating a learning graphical user interface displayed on the display member, and selecting a functionality of the software application, this learning graphical user interface comprising: —an area for transmitting an audio and/or video flow corresponding to a learning discourse,
 an at least partial reproduction of the specific graphic frame of the software application, comprising icons and/or tabs that are indexed to the audio and/or video flow to control the learning discourse, and —an area provided for displaying operations or sequences of operations necessary to perform the selected functionality, the operations being previously indexed, in whole or in part, with the audio and/or video flow.

While videos contribute to the active development of e-learning, their limits as mentioned here block their rapid and effective deployment in the professional environment, even though training needs have never been so exponential and perceived as such.

The purpose of the present disclosure is to provide an operational solution to this need and to offer a means of effectively supporting companies and organizations wishing to become real learning structures. The stakes are high. The medium- and long-term survival of their ecosystem necessarily requires faster learning processes.

BRIEF SUMMARY

This objective is achieved with a method for editorializing digital audiovisual or audio recording content of an oral presentation given by a speaker using a presentation support, the oral presentation comprising a succession of words and having been recorded in the form of a digital audio or audiovisual file, and the presentation support being enriched with tags.

According to the present disclosure, the method comprises:

a written transcription of the oral presentation with indication of a time code for all or part of the words.

comparative automatic analysis of the written transcription and of the tagged presentation support, transposition of the time codes from the written transcription to the tagged presentation support, identification of the tags and of the time codes of the presentation support, and marking of the digital audiovisual file with the tags and time codes, so as to generate an enriched digital audiovisual file.

In a first embodiment of the present disclosure, the editorialization method of the present disclosure implements a list of references intended to be cited orally during the oral presentation, and the presentation support has been enriched with tags associated with the references prior to the oral presentation.

In a second embodiment of the present disclosure, there is no prior reference list and tagging is carried out by the presenter, live from the broadcast of his audio or video presentation.

It should be noted that another version of the editorialization method according to the present disclosure may be provided in which a presentation support previously enriched with tags associated with references is modified live by the presenter during his audio or video presentation by adding tags to the support.

Within the context of the editorialization method according to the present disclosure, it is also possible to provide a step for excluding, from the time coding of all the words contained in the oral presentation, predetermined words for which no time code will be indicated during the transcription stage of the oral presentation. These predetermined words may, for example, be pronouns or articles.

The tags marked on the digital audiovisual file advantageously comprise structure tags and codes containing information relating to a citation.

The editorialization method according to the present disclosure may also comprise recovering the information contained in a code and exploiting this information.

In a particular embodiment of the present disclosure, the editorialization method further comprises a phase of aggregating the digital audiovisual files enriched with a plurality of knowledge environments, in a knowledge database structured in such a way as to make it accessible through a search engine.

It may further comprise a phase of traceability of copyrights or licenses attached to content in the enriched presentation support and/or in the enriched digital audiovisual file and/or in the temporal database of documented orality data and/or in the knowledge environment(s).

The tag identification step may further be designed to detect simple tags (S) before and/or after titles of a detailed presentation support outline, and/or tags (W) before and/or after keywords or concepts within the presentation support, but also to detect codes in the presentation support at the location of references cited orally.

In a particular embodiment of the present disclosure, the editorialization method implements a graphical interface providing a user of the method with digital tools to produce, from an oral presentation, a digital presentation support that is tagged and enriched with codes, the graphical interface containing:

a list for the choice of the main area of knowledge (K),
a table of orally cited references organized by predefined categorical data (C),
a table of tags (S) of the detailed presentation support outline,
a table of tags (W) of keywords or concepts.

The editorialization method may advantageously be implemented in the form of an application that can be downloaded to a computer or a smartphone or any digital medium.

The step of tagging the digital audiovisual file may comprise emitting signals corresponding to simple structure tags implementing a method for using the digital audiovisual file, designed to transcribe, from the tagged audiovisual file, a sound flow of words corresponding to the tagged segment.

This step of transmitting signals corresponding to simple structure tags may comprise transmitting the string of characters surrounded by the structure tags, these titles corresponding to the character strings thus surrounded being written directly into the digital audiovisual file, in the time stream corresponding to their evocation.

The method for exploiting the digital audiovisual file implemented in the marking step may be designed to read the textual information written on the digital audiovisual file.

The step of transmitting signals corresponding to enriched tags of type (C) may advantageously comprise, in response to an identification of a code in the oral presentation, transmitting a signal comprising all the information that the code contains by associating it with its time code during the presenter's oral narrative.

The code (C) and the time code associated with it are reported in a digital file provided for a structured temporal organization of the oral presentation.

The step of transmitting signals corresponding to keyword tags may comprise transmitting a signal providing a timestamp of the digital audiovisual file, as well as transmitting a string of characters surrounded by the tags (W), the character string thus surrounded then being written into the digital audiovisual file, in the time stream corresponding to the evocation of the keyword during the oral presentation.

The editorialization method according to the present disclosure may also comprise automatically constituting a consultation index of the keywords mentioned in the oral presentation. It may be implemented from a computer designed to read the digital audiovisual recording file once the audiovisual recording of the oral presentation has been completed.

In another embodiment of the present disclosure, the editorialization method may also comprise a phase of processing the tagged audiovisual file of the oral presentation comprising the steps of:

extracting tag and code data contained in the tagged audiovisual file, incrementing the tag and code data according to a temporal criterion (time code) in a matrix table, generating, from the matrix table, collections of data tables corresponding to predefined categories, the data tables comprising a structure table and category tables, creating interchangeable databases on the fly from the structure table and the category tables.

This method may further comprise a phase of creating one or more knowledge environments associated with the oral presentation, the creation phase comprising generating a temporal database. This creation phase may further comprise an editorialization of oral and documentary resources extracted from the temporal database.

According to another aspect of the present disclosure, a system is proposed for editorializing digital audiovisual or audio recording content of an oral presentation given by a speaker, this oral presentation implementing a presentation support and a list of references intended to be cited orally during the oral presentation, the oral presentation comprising a succession of words and having been recorded in the form of a digital audiovisual file, and the presentation support having been previously enriched with tags, characterized in that it comprises:

means for transcribing the presentation with indication of a time code for all or part of the words, means for carrying out a comparative analysis of the transcription and of the tagged presentation support, means for transposing the time codes of the transcription to the tagged presentation support, means for identifying the tags and the time codes of the presentation support, and means for marking the digital audiovisual file with the tags and time codes, so as to generate an enriched digital audiovisual file.

The editorialization system according to the present disclosure may further comprise means for traceability of copyrights or licenses attached to content in the enriched presentation support and/or in the enriched digital audiovisual file and/or in the temporal database of documented orality data and/or in the knowledge environment(s).

The editorialization method according to the present disclosure thus allows automation of the transposition of the structure, the citations and the content of the citations of a main discourse, on a written digital support, to an audio or audiovisual support that takes up the same content in an oral audio or audiovisual version, whatever the format of this account: narrative, explanatory, argumentative, demonstrative, illustrative, etc.

The result is a reduction in production costs and lead times for massive processing of audio and audiovisual content, and the possibility of large-scale automatic generation of digital training, training platforms and high-quality digital information.

The editorialization method according to the present disclosure will also allow automatic generation of links between the digital training content and the documentary resources of the organizations using the training, and will contribute to a significant improvement in the precision of the results of research carried out on the audio and audiovisual media and consultation and navigation within multimedia knowledge spaces.

Definitions

Main Discourse:

Hereinafter, main discourse means the same account in digital text version produced by an author and in spoken, oral version, recorded in video version, which is the main object of processing by the method according to the present disclosure. This account is of any type: narrative, explanatory, argumentative, illustrative, descriptive, etc.

Editorialization:

structuring, architecture of knowledge and know-how in a digital context

Digital Orality:

oral character in its digital dimension

Tag:

spatial marking, for example, a logotype or a tabulation, that can be read by a digital system Knowledge Environment:

Main thematic unit composed of editorialized digital orality or oralities, offered for consultation via a user interface.

BRIEF DESCRIPTION OF THE DRAWINGS

Other advantages and particularities of the present disclosure will become apparent on reading the detailed description of implementations and embodiments, which are in no way limiting, and the following accompanying drawings.

DETAILED DESCRIPTION

Since the embodiments described below are in no way limiting, it is possible, in particular, to consider variants of the present disclosure comprising only a selection of features described in isolation from the other described features (even if this selection is isolated within a sentence comprising these other features), provided that this selection of features is sufficient to confer a technical advantage or to differentiate the present disclosure from the prior art. This selection comprises at least one preferably functional feature without structural details, or with only a portion of the structural details if this portion alone is sufficient to confer a technical advantage or to differentiate the present disclosure from the prior art.

Figure 1:
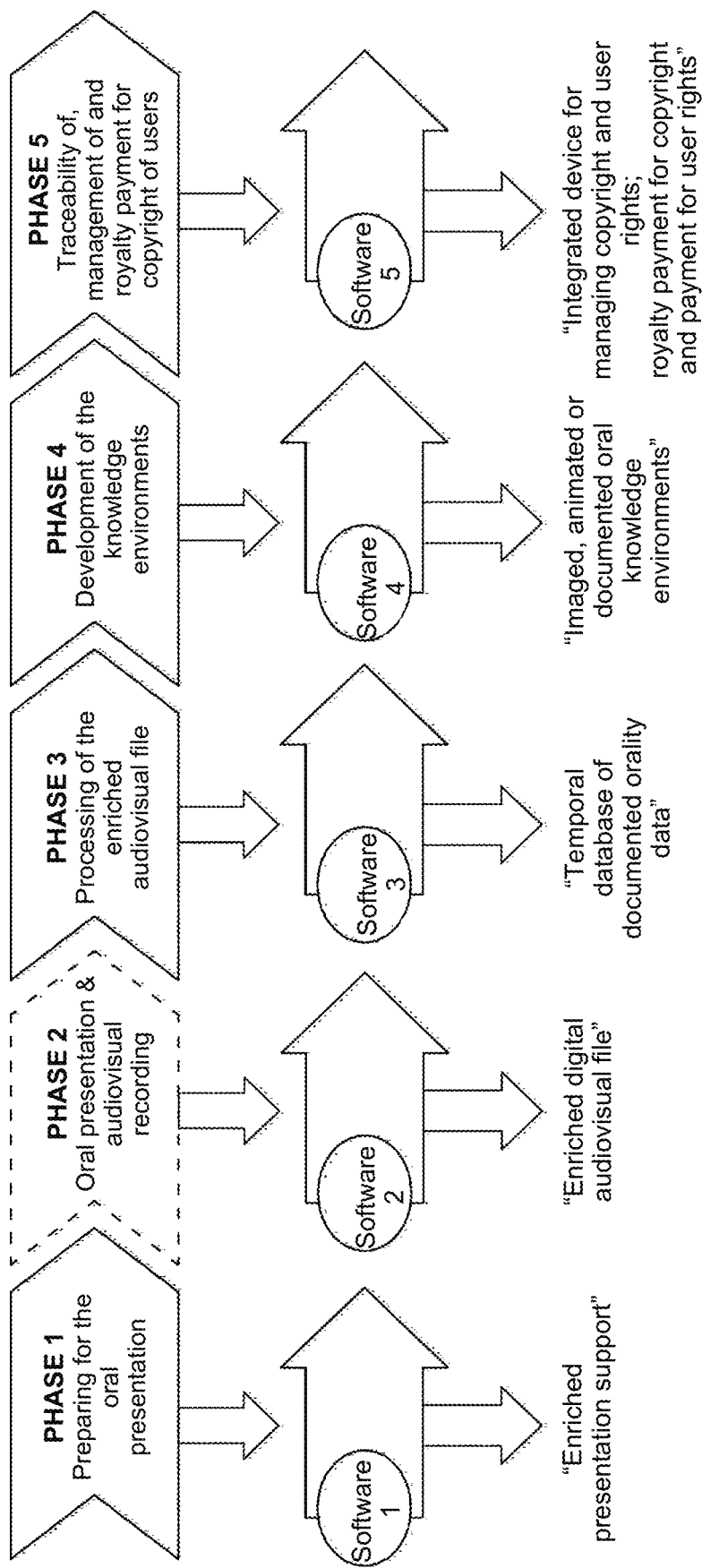
FIG. 1 illustrates the main steps of the method according to the present disclosure.

A description will now be given, with reference to FIG. 1, of the different phases of an example of implementation of the editorialization method according to the present disclosure. Each phase P1-P5 is associated with software LO1-LO5.

Phase P1 is a preparatory phase for the oral presentation, which produces an enriched presentation support. Phase P2 corresponds to the oral presentation and its audiovisual recording. It produces an enriched digital audiovisual file. Phase P3 corresponds to processing the enriched audiovisual file and it produces a temporal database of documented, imaged or animated orality data. Phase P4 corresponds to developing documented, animated or imaged oral knowledge environments. Phase P5 includes the traceability, management and payment of royalties for presenters and contributors, and it notably produces an integrated mechanism for managing royalties.

One possible option consists in deleting phase P2, by exploiting the result of phase P1 directly in the operating software LO3 from the audiovisual recording.

Another possible option consists in merging phases P1 and P2, particularly remotely. In this hypothesis, the author tags his live presentation using LO2 configured for this purpose, in particular, for the remote mode.

For pre-processing of the presentation support, the objects to be tagged by the author are:

the Structure elements of the oral narrative: all the titles (word strings) of the detailed outline of the oral presentation, the data or references cited: the elements cited orally in illustration, argument or explanation references, keywords or concepts: all the words or concepts that the author considers important or specific or relevant in the context of his presentation and that do not necessarily appear in the wording or character string of the titles.

To create a structure tag, the character string of each title is framed. By way of example, the following rule may be provided: in the presentation support, the author places a Tag (S) before AND after each title, subtitle, sub-subtitle up to ten levels of indentation.

For the end user, the structure tag allows:

easy and structured access according to the author's narrative by the author himself, a structural hierarchy of knowledge, to accelerate the process of understanding and assimilation, an alternative solution (and probably more effective for learning) to the full transcription of a narrative recitation of knowledge.

The editorialization method according to the present disclosure involves complementary cognitive reflexes of synthetic reading of the architecture of the discourse (anchoring by the visual memorization of the logical structure elements of the discourse) associated with listening to the illustrative and argumentative narrative of the outline structure.

On a technical level, the structure tag allows:

industrialization of the automatic generation of ultra-granularized video content access tables;

specification of the duration of each part;

gains in reliability and relevance (it is the author who structures his own content, or the publisher whose job it is to do so);

tracing of each sequenced fragment of the discourse;

several possible consultation keys according to the linearity of the author's outline, independently and/or combined with other digital orality fragments relating to the same word, concept or document sought, creation of a thematic logical consultation chain of combined orality fragments associated with their complete evocation context by associating any cited data that are also present and searchable. This allows a new augmented listening functionality to be created that provides accelerated access to spoken content of a key concept.

Now described is the process of creating reference tags and oral citations. A first rule concerns the creation of codes: from the list of references that will be cited orally, created by the author, the author selects the entire character string that makes up the reference that will be cited orally during his presentation. He associates the "C" icon with it corresponding to its category. By clicking on the "C" icon the reference code is created. At the end of this step, a list (2) of "codes" is created. It is this list of codes that will then be used by the author so that each code can be inserted in its (oral) citation location, in the text or presentation support.

Figure 2:
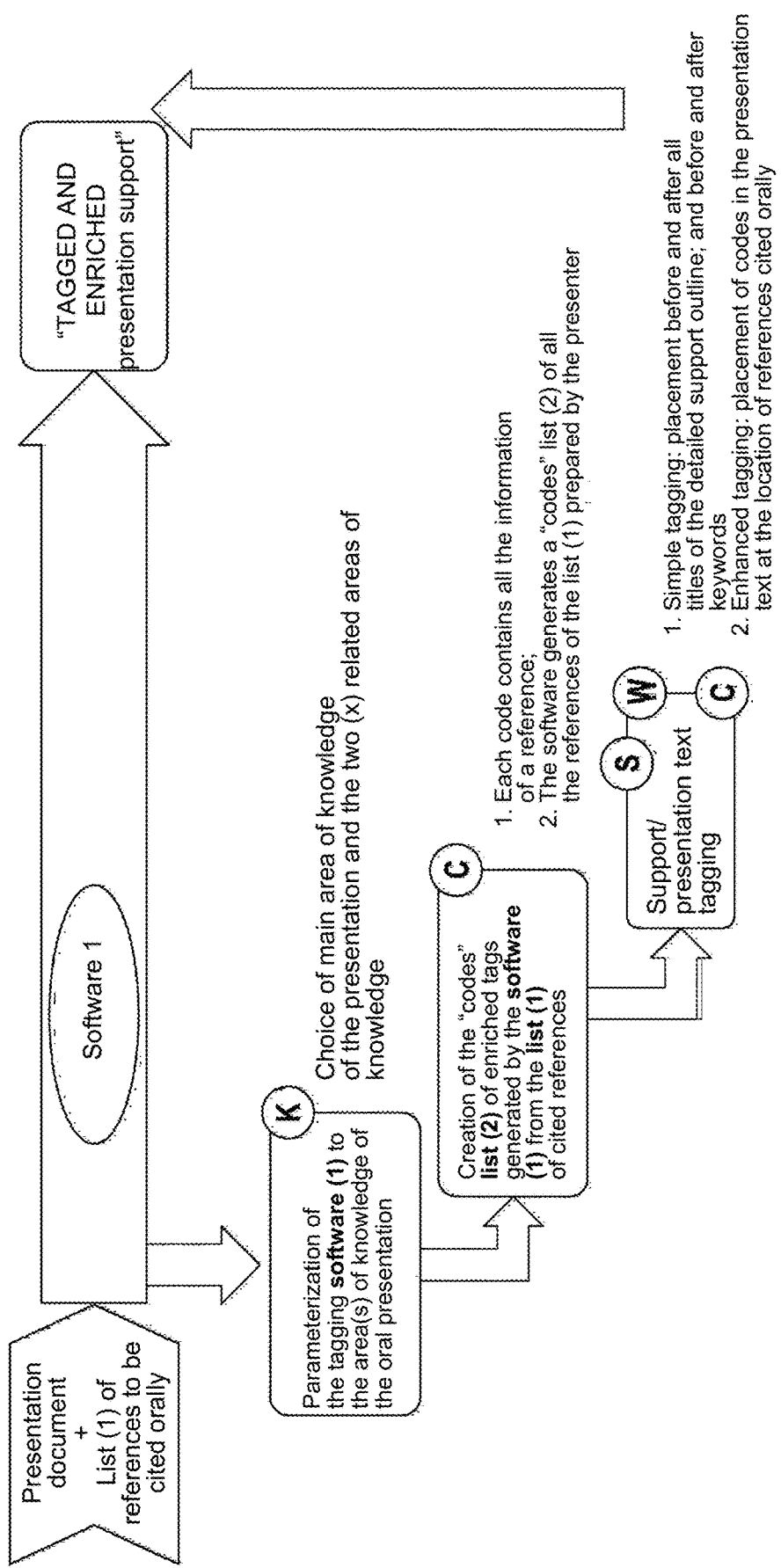
FIG. 2 illustrates the operation of phase 1 of the method according to the present disclosure.

With reference to FIG. 2, it should be noted that owing to the pre-parameterization of the software LO1 in the field of knowledge selected by the author, the codes are already pre-parameterized. All the information selected by the author is associated with each code created. The Categories of "codes" therefore already contain all the meta information of the references used in the context of the author's knowledge. "K" therefore conditions, at least in part, the data of the "C" codes.

A second rule concerns the insertion of codes in the presentation support: from the List of Codes, the author inserts each code in its oral citation location in the Presentation Support. These codes contain all the information of the cited data. They enrich the "presentation support" document, alongside and in addition to the "S" Tags. It should be noted that the "C" Tags are themselves advantageously located in the logic structure of the discourse owing to the "S" Tags previously inserted in the same presentation support.

For the end user, this method allows:

production of a hyper-contextualization of the cited data.

not to have to search for the references cited when consulting the knowledge environment and listening to the narrative. All the references cited are accessible in full in the majority of cases while watching the video and are traceable within the framework of a blockchain system including, where applicable, the management of copyrights and/or publisher rights.

definitive attachment of data information units to any presentation referring to them orally (whether to comment on them, to give an explanation, to illustrate an idea or an argument, by analogy, etc.).

On a technical level, this method allows:

contextual processing of third-party data present in other databases and intended to be used or exploited in contexts of analysis and construction of arguments by users or authors.

optimization of the processing of third-party data in terms of relevance, traceability, integrity by avoiding the multiplication of manual entries. Only one is done by the author upstream, who has all the information selected from the beginning to the end throughout the editorialization process.

An embodiment of keyword tags will now be described. It implements a framework of a character string forming a keyword or a key concept. The implementation of the editorialization method according to the present disclosure will allow automatic tracing of one or more relevant sentences for an understanding of the word or the concept that they contain.

For the end user, this method allows:

generation of a list of keywords: i.e., an index of keywords offering targeted access to the passage of oral evocation of the keyword or concept, by accessing a moment just before the citation that is sufficiently relevant for the consultation to make sense;

improved targeted consultation of digital orality and thus improved handling thereof, facilitating their operational use in a work context.

On a technical level, this method allows:

generation reinforcement of the referencing of the content by the list of keywords or concepts, in addition to the universal or business classification systems.

automation of the contextualization, prioritization and relevance of keywords and concepts by relying on the hyper-granularization of the narrative.

A rule may be defined that refers, by default, to the Tag "S" closest to the keyword. This ensures that consultation of the "keyword or concept" is relevant in its hierarchical and citation logic environment without having to "go back" in the listening time manually to find the meaning of the consulted word or concept.

For "W"-type tags, the author places the "W" tag before AND after each important "keyword or concept."

This first preparatory phase P1 leads to the creation of a digital presentation support in text or any format, tagged and enriched with enriched codes.

In a first option, this presentation support, tagged and enriched with codes, can be placed in a technical device shortly before the presentation begins.

In a second option, this presentation support tagged and enriched with codes will be placed in software LO3 after the presentation in combination with the digital audiovisual file of the oral presentation. The tags and enriched codes are transferred to the digital audiovisual file, in strict compliance with the narrative temporality of the presentation.

Figure 3:
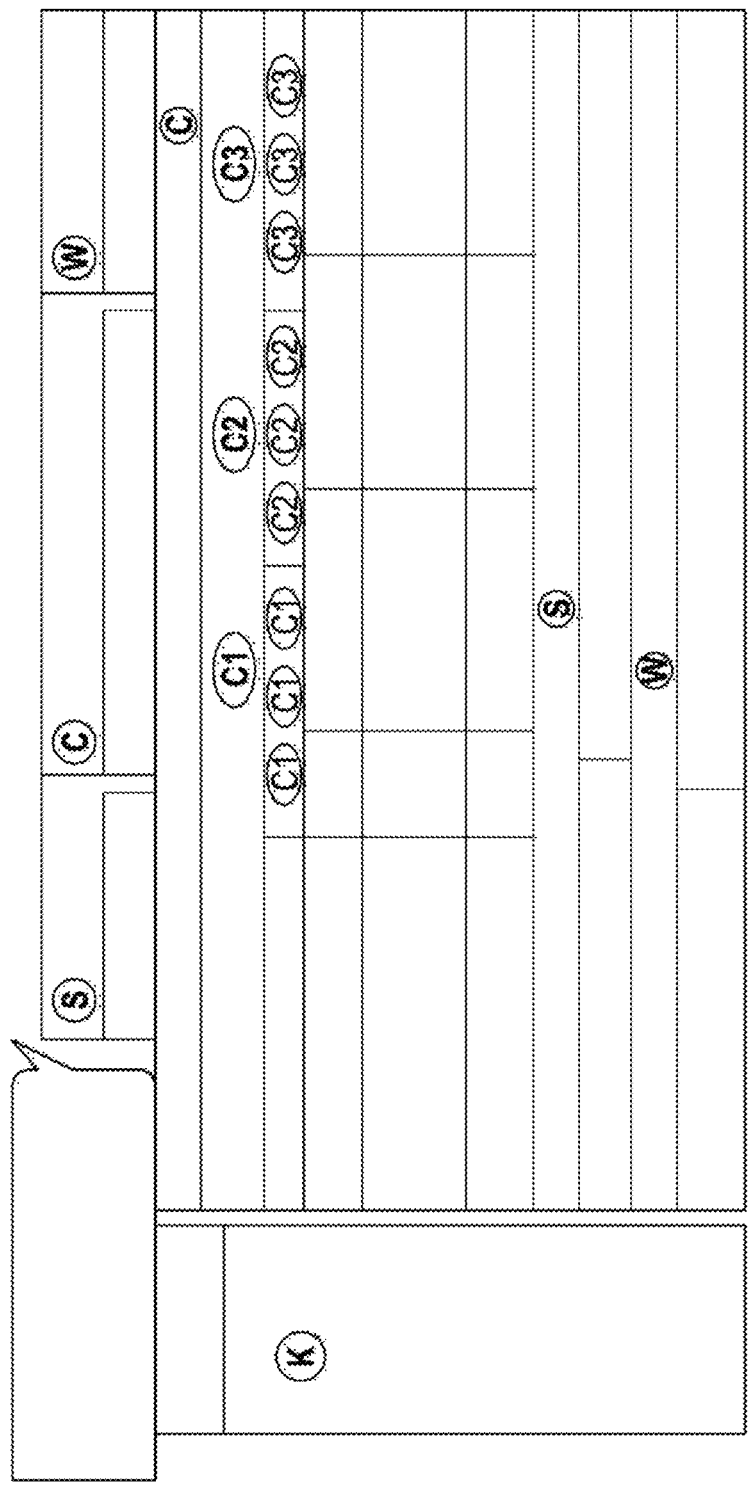
FIG. 3 shows an example of a user interface generated with the method according to the present disclosure.

With reference to FIG. 3, a graphical user interface allows viewing on the same screen page of a set of lists of the tag categories implemented in preparatory sentence P1. This graphical interface thus represents a list K for choosing fields of knowledge, a table C of references cited orally including category data C1, C2, C3 generic to the field of knowledge of the presentation, a table of structure tags S of the detailed outline of the oral presentation, and a table of keywords and key concepts W.

Figure 4:
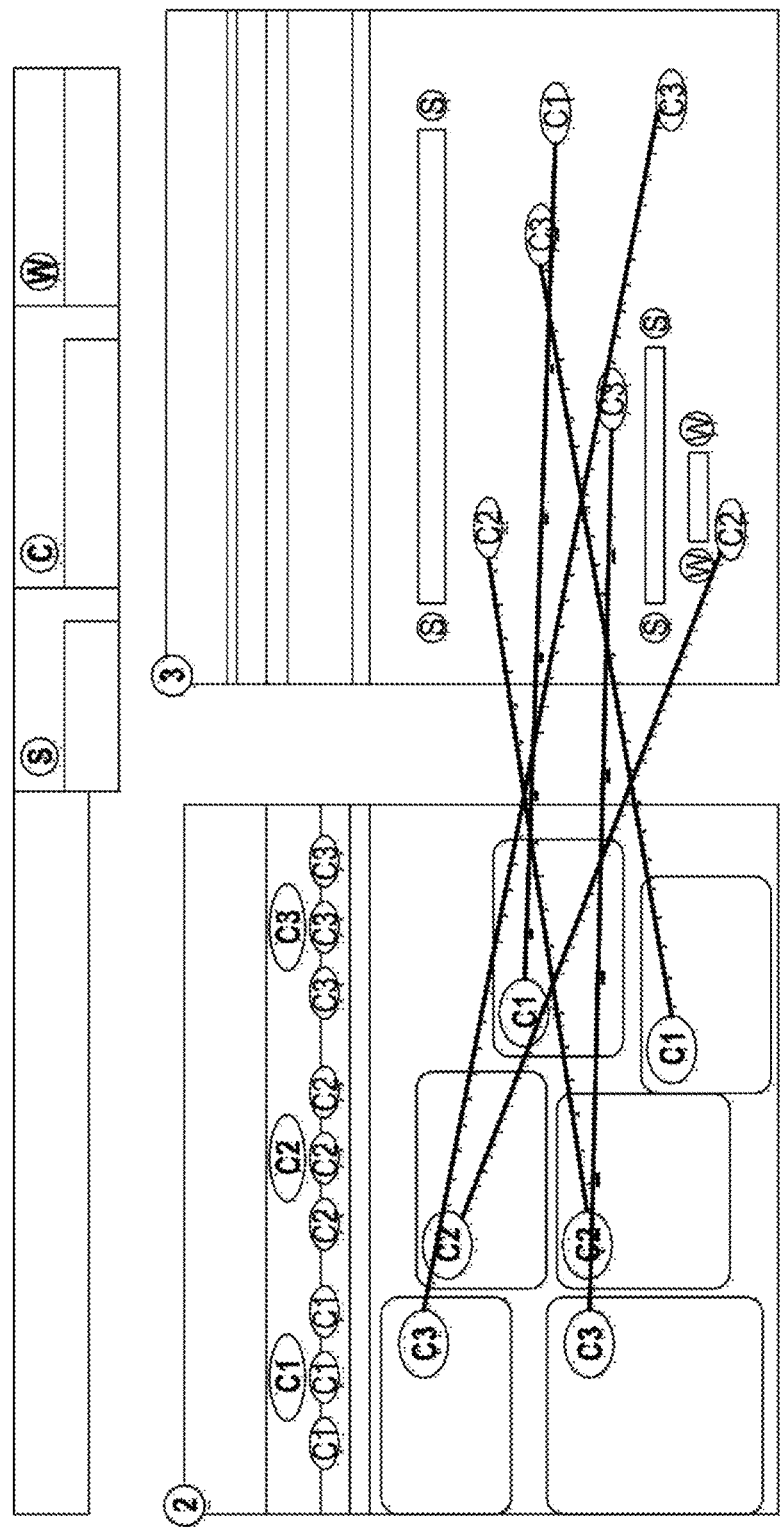
FIG. 4 illustrates a step for creating a tagged and enriched presentation support.

With reference to FIG. 4, a graphical interface provides the user on the one hand with a graphic representation of a list of codes of the oral presentation illustrating the various code tags C1, C2, C3 of references to be cited orally, these tags containing all the information structured by data type, and on the other hand a representation of the presentation support document tagged and enriched by the author, with graphic connections between the C codes and the locations of the references to be cited in the presentation support.

Phase 2 of the editorialization method according to the present disclosure is dedicated to the oral presentation and to its recording in the form of a digital audiovisual file.

In a first option, the method according to the present disclosure is implemented synchronously with the oral presentation.

In practice, the method is implemented in the form of a software application LO2 to be downloaded onto a phone or a computer. The operator is the presenter himself or an assistant. The software application is launched just before the beginning of the oral presentation.

In a second option, this phase 2 is carried out asynchronously, after the oral presentation. The software LO2 then combines the presentation support file with the digital audiovisual recording file.

The software LO2 integrates a speech recognition software module associated with an automatic text reading software module and it is designed to emit a signal that will mark, by means of a tag or a code, the video tape or real-time digital recording (synchronous mode).

In the first option, before starting his presentation, the author inserts his tagged presentation support file in the tagging software. Speech recognition is performed in real time and commands character recognition in the tagged presentation support.

This is followed by an emission of the tags identified by the software LO2 in the presentation support in synchronization with the oral statement of the presentation. The digital audiovisual file is then marked with structural elements and codes integrating all the information of the references, citations and knowledge objects, cited orally, in its temporal unfolding.

In the second option, after the oral presentation, a digital presentation video file is recovered that is free of any tags. The presentation is transcribed with an indication of a time code for each word.

A comparative analysis of the transcription of the presentation and the tagged presentation support is then carried out. The time codes of the transcription are then transposed onto the tagged presentation support. The tags and time codes of the presentation support are read, then transmitted onto the presentation video file according to their time codes.

Each time the software LO2 identifies a tag or a citation code, it emits a signal that must be capable of marking the digital audiovisual file being recorded from the presenter's discourse.

The transmitted signal is used to mark the digital audiovisual file with a TAG:
  either a simple time tag for structure tags;
  or a "code" tag containing all the information relating to a citation.

This information contained in the code will then be retrieved and used by the software LO2, which is capable, from the audiovisual digital file, of reading the code, the information it contains, and incrementing it in a database or a structured spreadsheet document or any other way allowing the content to be used.

There are several types of signal emission:
  an emission specific to structure tags (S),
  an emission specific to codes (C).

In a first option, a simple emission of a signal capable of a simple TEMPORAL marking of the audiovisual file is carried out. This requires a posteriori operating software LO3 capable, from the tagged audiovisual file, of transcribing the sound flow of words corresponding to the tagged segment.

In a second option, an emission of the character string is carried out, surrounded by the TAGs (S): the titles are directly recorded in the digital audiovisual file, in the time flow corresponding to their evocation. Textual data enrichment TAG (S). This requires digital audiovisual file operating software capable of reading the textual information written in the audiovisual file (this written information not being visible to the naked eye for the person viewing the video).

This signal generation allows automatic constitution of the detailed outline of the oral narrative and listening access thereto, and the targeted and segmented consultation according to the author's logic.

A mode of generating signals associated with C codes will now be described.

The Software LO2 emits the C code that contains the pre-populated structured information of the reference cited orally accompanied by its full wording as scanned by the author/presenter/publisher, associated with its "time code" of oral evocation during the presentation.

After the Software LO3 has identified the code, it is capable of emitting a signal containing all the information that the code contains by systematically and definitively associating it with its citation time code during the oral narrative recitation of the presenter. This provides the means for perfect contextualization of the data cited in the evocation context(s) of digital oralities.

The references are for the most part the objects of study of narrative and explanatory accounts, and cognitively this meshing of the cited references is definitive and systematic.

The result of this phase 2 is a tagged digital audiovisual file comprising all the codes relating to the mentioned citations. This tagged and enriched digital audiovisual file is similar to a primary "database" that contains all the data to be editorialized. It is therefore their classifications and their reorganizations according to clearly defined principles and models, in coherence with the initial prerequisites, that will make it possible to formalize complete knowledge environments, with structured, hierarchical and contextualized knowledge.

The method according to the present disclosure thus allows the automatic constitution of a consultation index of the references and citations of the oral narrative.

The time codes and the C codes will be automatically reported in a document or technical device that will allow the structured temporal organization of the discourse and the reference contents that it contains.

As regards the keyword tags W and associated signals, in a first option, a simple transmission of a signal capable of a simple temporal marking of the audiovisual file is carried out. This requires operating software LO3 capable, from the tagged audiovisual file, of transcribing the sound flow of words corresponding to the tagged segment.

In a second option, an emission of the character string is carried out, surrounded by the tags (S): the keywords or key concepts are directly recorded in the digital audiovisual file, in the time flow corresponding to their evocation. This requires digital audiovisual file operating software LO3 capable of reading the textual information written in the audiovisual file (this written information not being visible to the naked eye for the person viewing the video). This method allows the automatic constitution of a consultation index of the keywords of the oral narrative.

Figure 5:
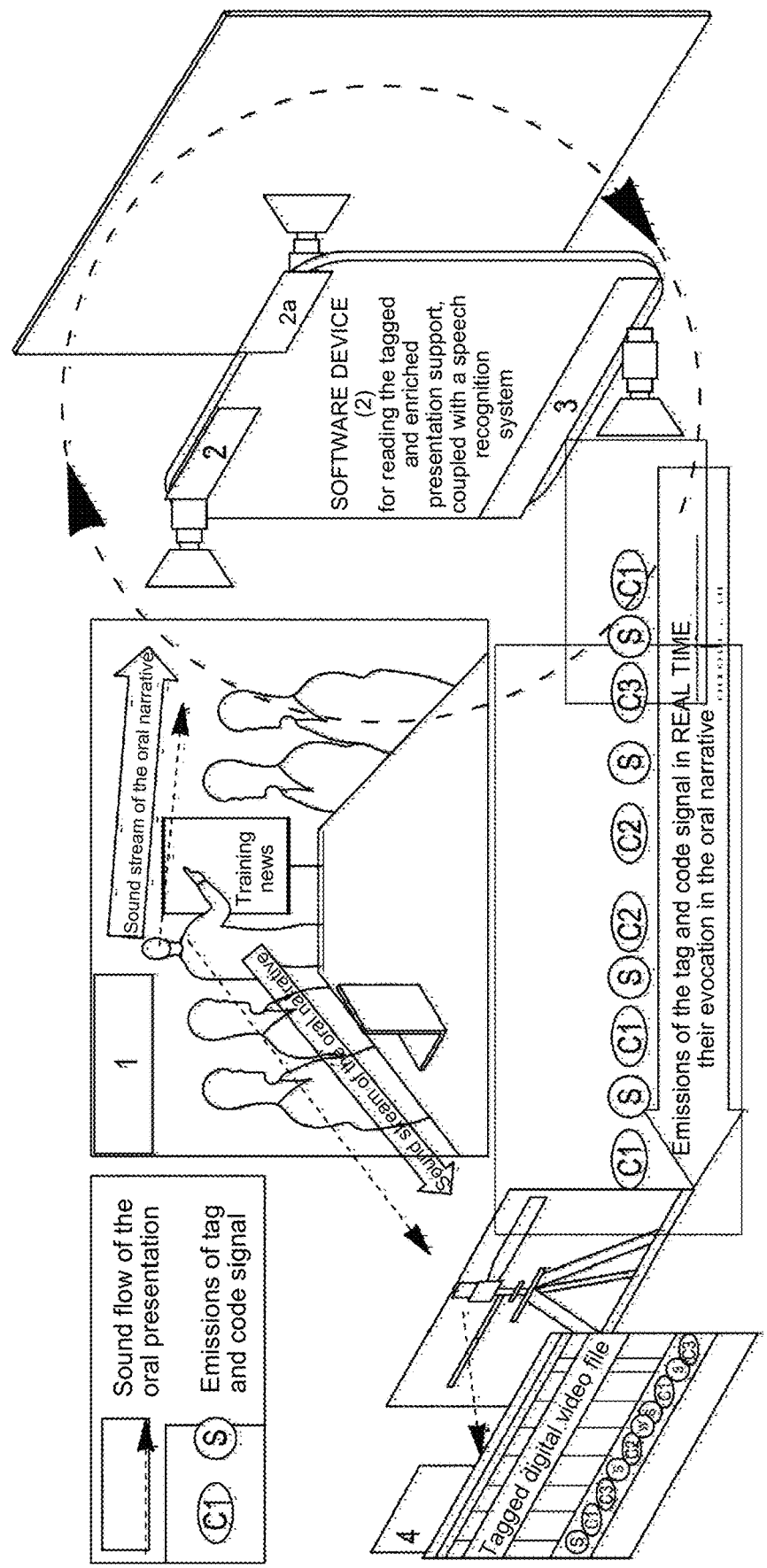
FIG. 5 is a spatial visual of the Technical Steps in a first option.

Referring to FIG. 5, which illustrates a spatial visual of the steps of phase 2 in synchronous mode, the sound flow of the oral narrative is captured and submitted to a speech recognition system coupled to a system for reading the tagged and enriched presentation support. This is followed by a real-time emission of tag signals and codes of their evocation in the oral narrative and a visualization of the sequence of tags and codes.

Figure 6:
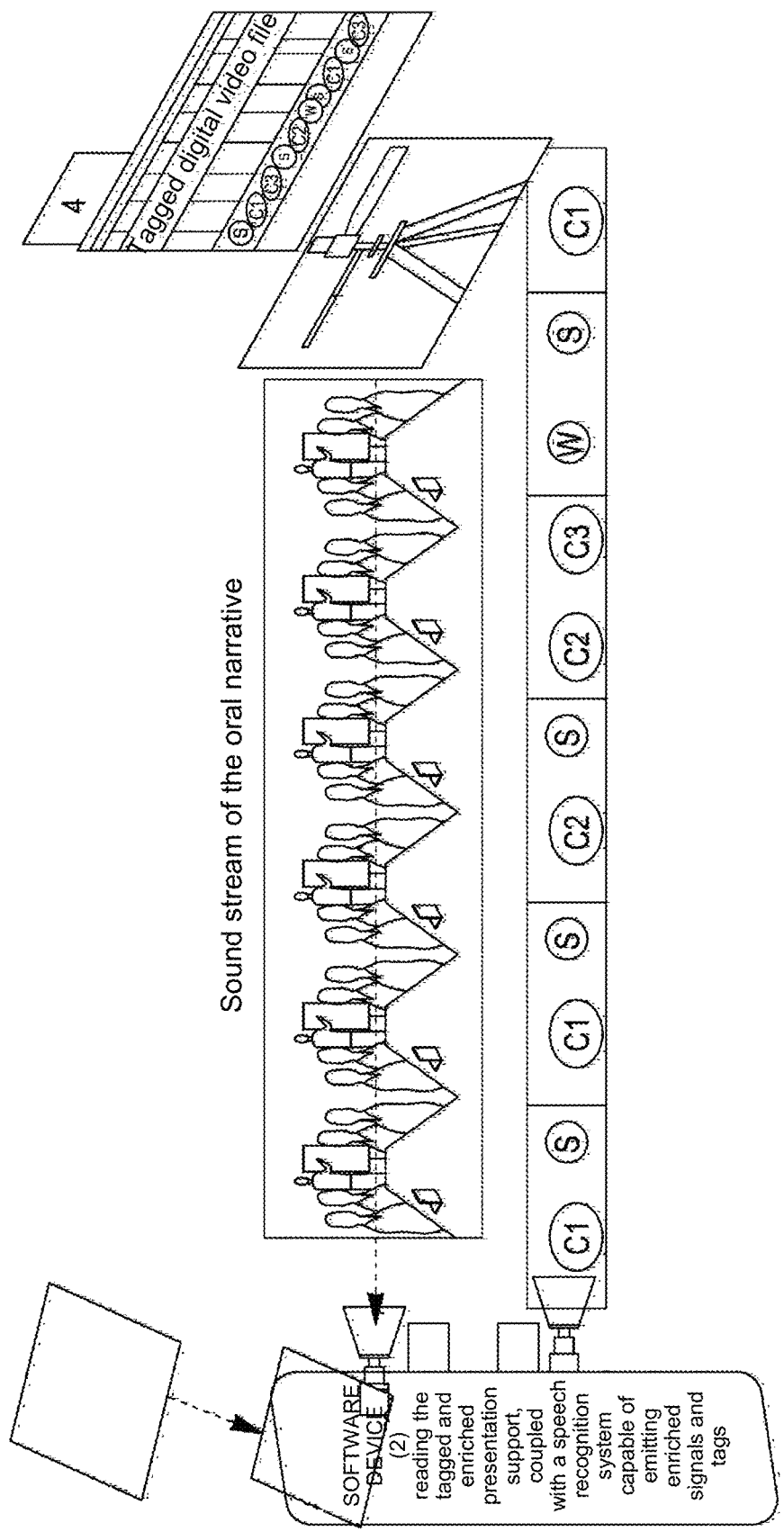
FIG. 6 is a time visual of the Technical Steps in the first option.

With reference to FIG. 6, which illustrates a temporal visual of the steps of phase 2 in synchronous mode, as soon as the speech recognition system enters into correspondence with either a structure tag (S) or a code (C), it emits a signal containing the tagged or coded information. The tagged and/or coded information is received and printed on the digital audiovisual file in real time. A definitive time code is associated with them.

Figure 7:
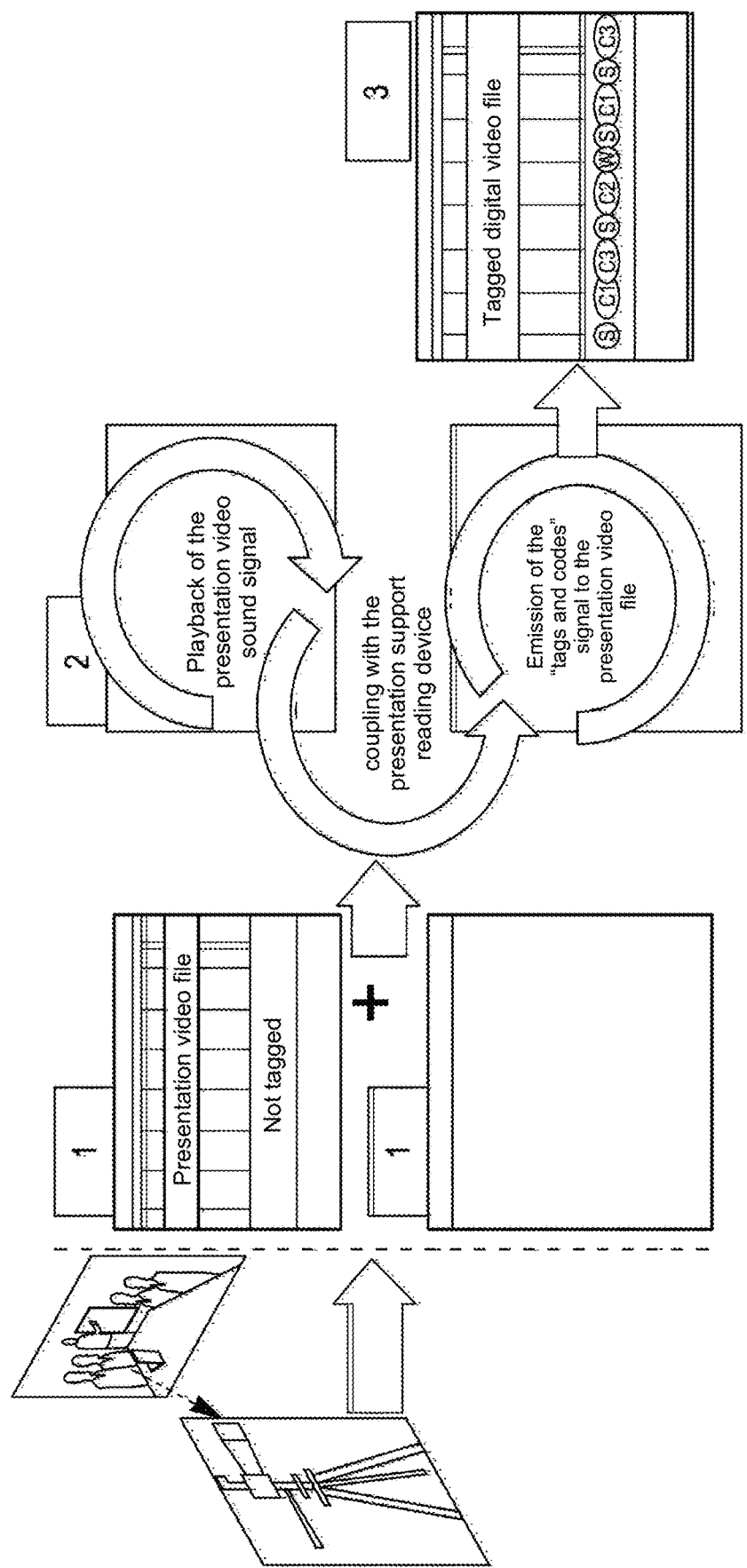
FIG. 7 is a spatial visual of the Technical Steps in a second option.
Figure 8:
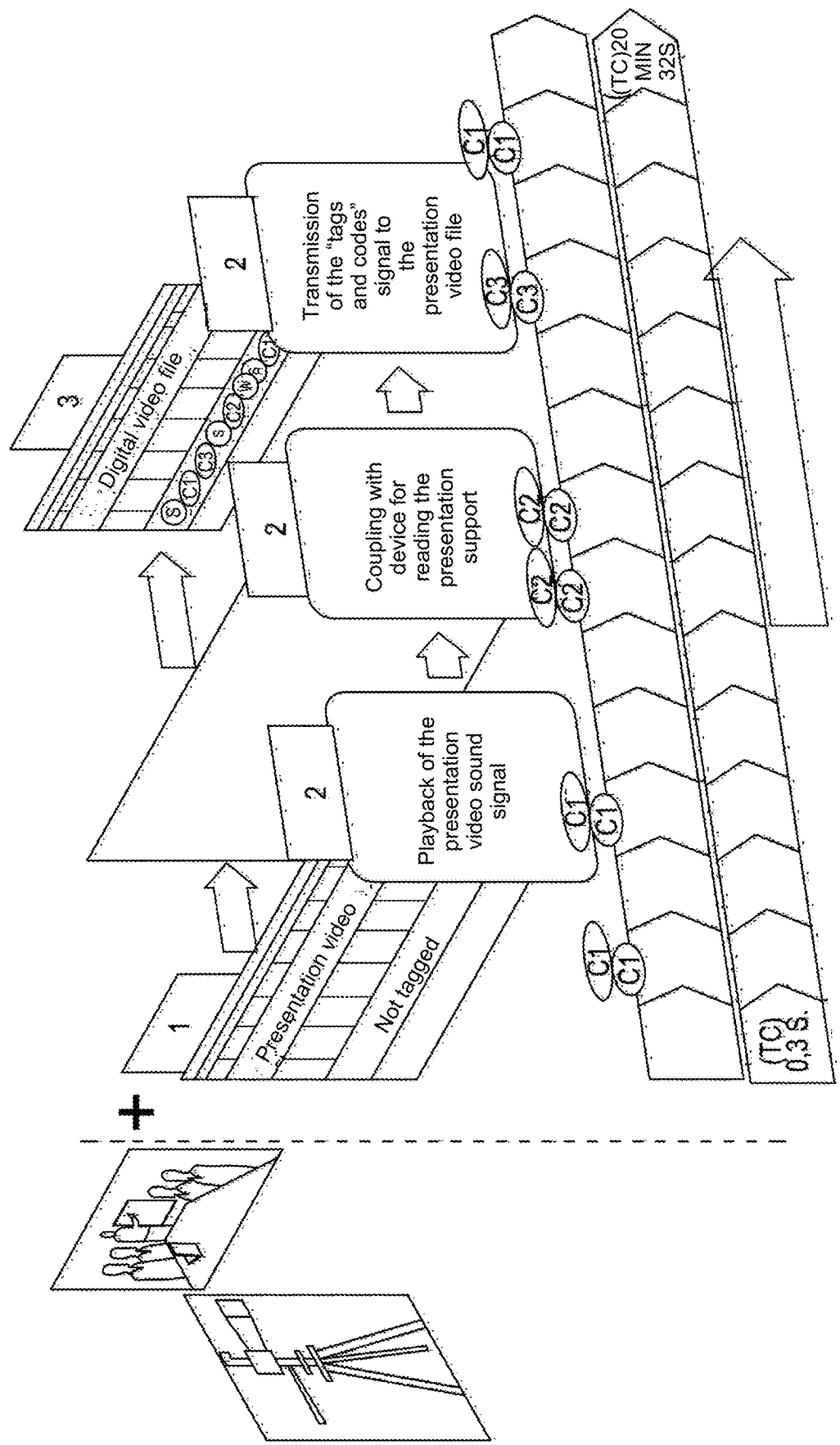
FIG. 8 is a time visual of the Technical Steps in the second option.

With reference to FIGS. 7 and 8, which respectively illustrate a spatial visual and a temporal visual of the stages of phase 2 in option 2, the video file of the oral presentation is combined with the tagged and enriched presentation support. A reading of the sound signal of the video of the oral presentation is carried out, which is coupled with a reading of the presentation support, then a tag and code signal is transmitted to the presentation video file to deliver a tagged digital video file.

The result of this phase 2 is a tagged digital audiovisual file comprising all the codes relating to the mentioned citations, with a temporal mesh of the written data and the oral discourse.

Figure 9:
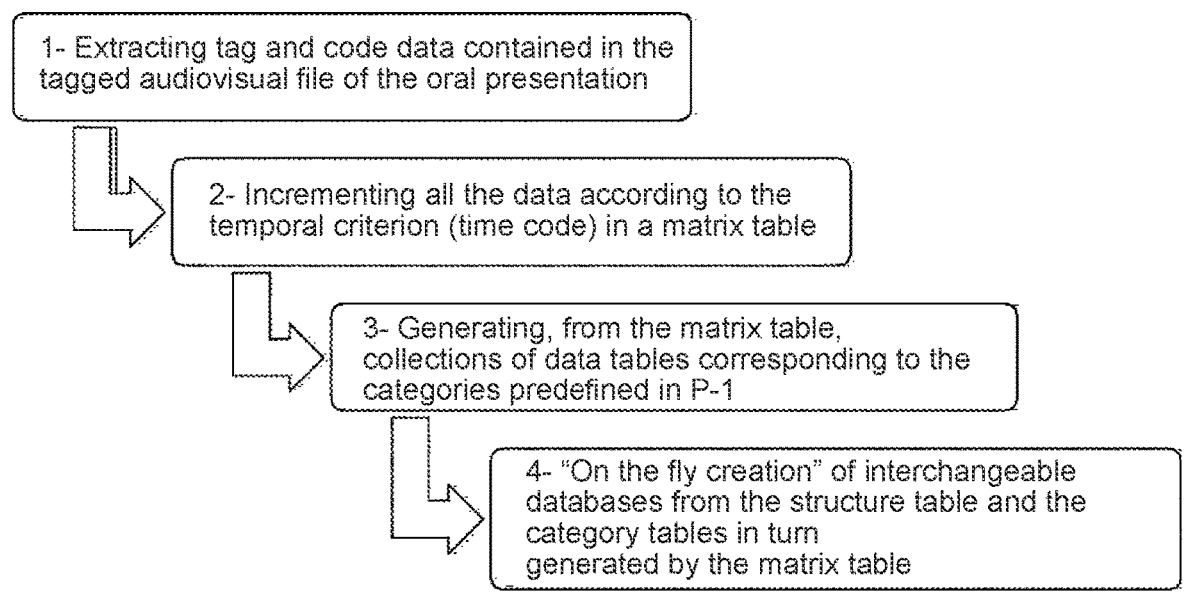
FIG. 9 shows the main steps of phase 3 of the editorialization method according to the present disclosure.

With reference to FIG. 9, the steps of phase 3 of processing the enriched digital audiovisual file will continue to be described, at the same time as the operation of the software LO3.

Figure 10:
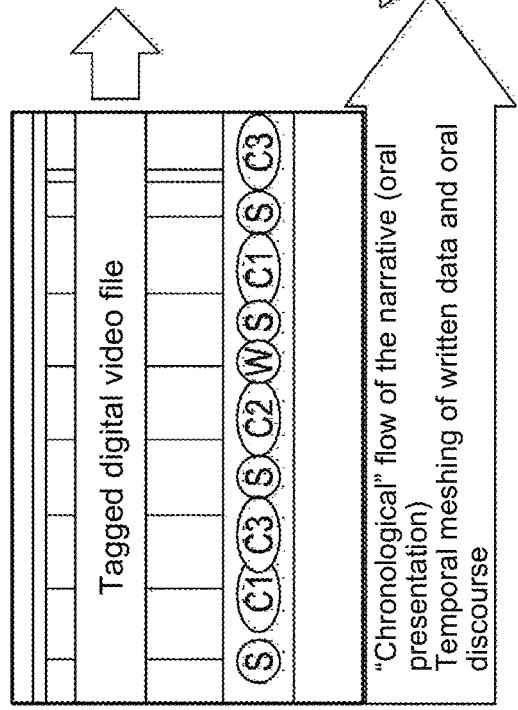
FIG. 10 illustrates the data extraction step in phase 3 of the method according to the present disclosure.
Figure 11:
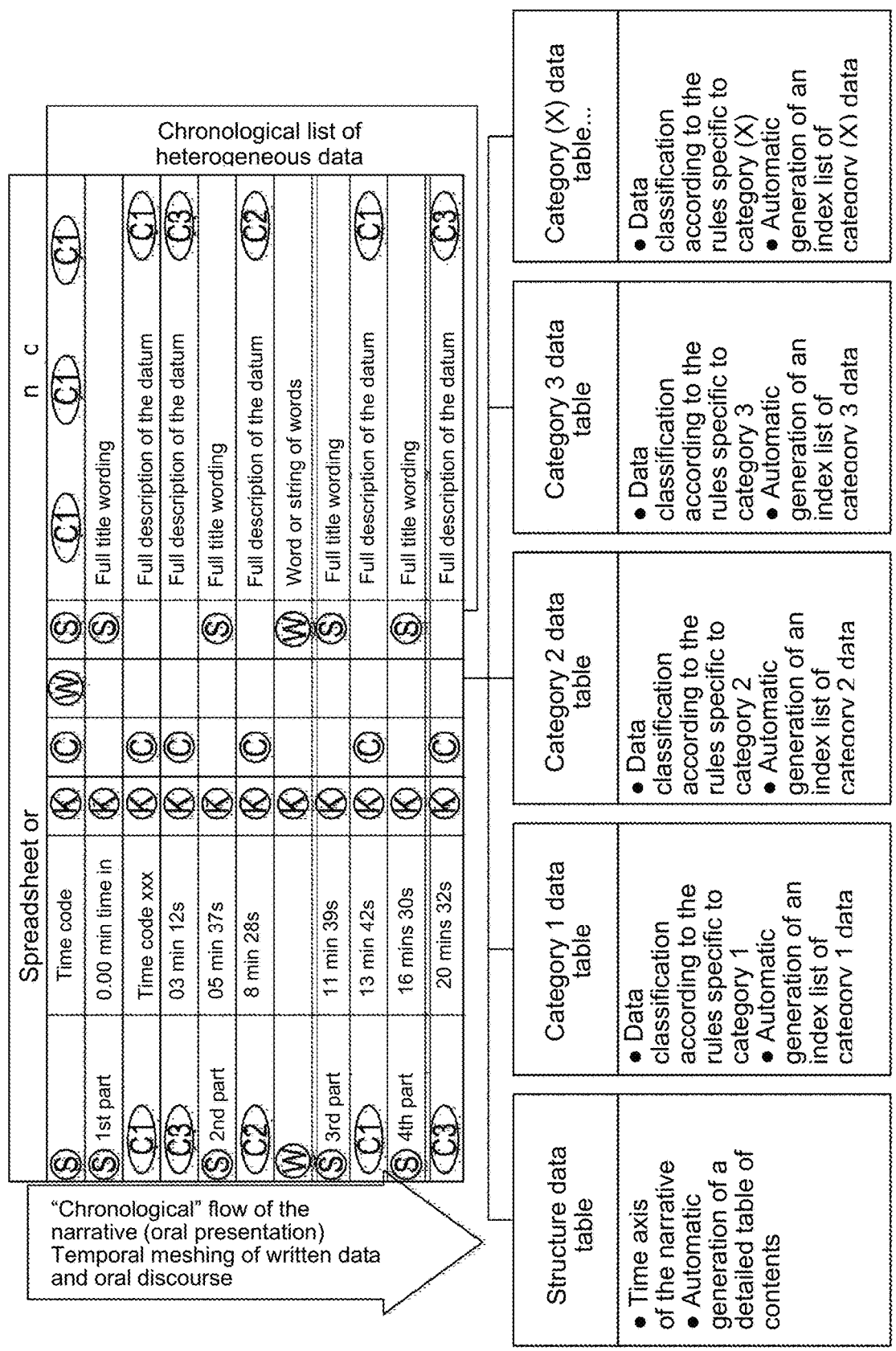
FIG. 11 illustrates the step of creating category tables from a matrix table.

This phase 3 comprises:
- a step for extracting the tag and code data contained in the tagged audiovisual file of the oral presentation, as shown in FIG. 10,
- a step of incrementing all the data according to a temporal criterion (time code) in a matrix table,
- generating, from the matrix table, collections of data tables corresponding to the categories predefined during the preparatory phase, these tables including a table of structures and category tables, as shown in FIG. 11,
- on the fly creation of interchangeable databases from the structure table and the category tables.

The processing of the audiovisual file comprises:
- recovery of time data and character strings for the TAG (S),
- recovery of decrypted time data of the CODES (C) and recovery of encrypted information in the codes.

The extracted and decrypted data associated with their time codes are then transmitted and incremented in a file or in a structured table defined especially for this purpose. It should be noted that a blockchain may be implemented for this.

It is also provided to increment the citations (CODE C) according to the predefined categories using an identification of the objective structural data specific to each field of knowledge.

A classification according to the hierarchies specific to these category data is then carried out. The data contained in the codes, associated with the data relating to the cited references, are used. The same applies to data within the framework of a predefined environment on a visual and graphic level to restore and give access to the narrative in its entirety, but above all by offering targeted temporal access to the discourse or to cited data, always contextualized to meet the relevance requirement.

The Structure Table generated from the matrix table allows a detailed table of contents of the presentation (oral narrative) to be reconstituted from the list of titles (S). Represented in written form on the screen, it will allow a very detailed consultation of the content, following the Chronology of the presenter's narrative.

The Structure Table serves as a contextual marker for other cited category data. The category data are presented in the visual space that separates two titles, according to their citation time, and excluding any textual transcription of the oral narrative recorded on video.

A systematic calculation of the last time code of each title (time out of the title(s)) compared to the time in of the title(s) makes it possible to determine the exact duration to the nearest second of each part that makes up the detailed table of contents. In terms of use, this information is essential to allow the user to control his consultation.

The structure information is used to generate the detailed table of contents, which in turn serves as an access table to the sequences of the oral presentation in the end user interface. Up to ten levels of indentation can be provided to allow a sufficient and relevant granularization of knowledge both in consultation mode and in search mode.

This structure information also allows constitution of the corpus of the keywords of the oral presentation, to which the specific keywords are added that are marked as such by the author or the presenter with the code W, as well as the contextualization of the category data (C) that are situated in a time value interval (between two time codes) that allows them to be recontextualized at all times, whatever the viewing angle chosen.

Category elements are used to generate the index of category 1 data, for example, chemical compounds. The sorting index is not temporal: it is specific to category 1.

The index not only allows the consultation of the data in its own category logic, but it also allows an in situ consultation of each category 2 datum, in its citation context(s) during the oral narrative that explained or evoked it.

For phase 4 of development of the knowledge environments, within the framework of the editorialization method according to the present disclosure, it is advantageously possible to implement functionalities disclosed in documents FR2849564, FR2878345 and FR2910987.

Phase 5 can be achieved by implementing a temporal database of oralities and cited references, navigation and cognitive design principles and a library of design templates.

In the table below, inputs, functionalities and outputs of three software modules L1, L2, L3, L4 of the type of software LO1, LO2, LO3 will be developed by way of non-limiting example embodiments of the editorialization method according to the present disclosure:

the exclusions of words, for example, the exclusions of pronouns and articles (personal, definite, indefinite, possessive, etc.).

In the software module L3, at the end of the transfer operation of the time codes from RETRANSCRIT-V1 to Text-V2, the two text versions contain similar time codes. The transfers of the tags from TEXT-V2 to RETRANSCRIPT-V1 are carried out based on the correspondence of the time codes present in the two versions resulting from the previous transfer step.

The RETRANSCRIT-V2 output from the software module L3 comprises:
the transcribed version of the audio-video version of the Main Discourse,
time codes positioned line by line, word by word and paragraph by paragraph,
tags (S), (C) and (W).

The Audio-video output V2 of the software module 4 comprises:
the audio-video version of the Main Discourse,
the structure tags
the citation tags and their content
the keyword tags

| Software module | Input | Features | Output |
|---|---|---|---|
| L1 | Main Discourse in plain text version TEXT-V1 | Semi-automatic tagging of the TEXT-VI version of the Main Discourse: tagging of the detailed outline of the Main Discourse tagging encapsulation of information content cited in the Main Discourse | Main Discourse in Tagged Text version TEXT-V2 |
| L2 | Digital audio-video file from which the stream, the sound bytes of all or part of the Main Spoken Discourse or its digital vocalization are exploited AUDIO-VIDEO-V1 | transcription of the AUDIO-VIDEO VI sound recording of the Main Discourse, on a text file RETRANSCRIPT-V1 recording, on RETRANSCRIPT-V1 in the margin(s) of each line of text, of the entry time codes (TC) and the end time codes (TC) of a line of text marking structure tags (S) and codes (C) and placing time codes (TC) before and after each tag. | Transcribed version of the audio-video version of the Main Discourse, enriched with the corresponding time codes (TC) positioned: line by line word by word paragraph by paragraph RETRANSCRIPT-V1 |
| L3 | RETRANSCRIPT-V1 + TEXT-V2 | transfer of time codes (TC) from RETRANSCRIPT-VI to TEXT-V2 transfer of all tags from TEXT-V2 to RETRANSCRIPT-V1 | RETRANSCRIPT-V2 |
| L4 | RETRANSCRIT-V2 + AUDIO-VIDEO-V1 | 1-The software L(4) transfers ALL TAGS FROM RETRANSCRIPT - V2 TO THE AUDIO-VIDEO FILE | AUDIO-VIDEO-V2 TAGGED audiovisual file of the presentation |

The version TEXT-V2 output by of the software module L1 comprises:
the presentation text
the structure tags (detailed outline tags)
content tags (encapsulating information content cited in the Main Discourse).

It is important to note that when the author usually writes his text and outline, the software L1 can automatically tag on the Text digital support. In this case, the "titles," "bullets," "numbering," etc. functions of any Text software are linked to the software L1, which generates the tags as soon as the "titles" chip functions are activated. The author can retain control and add tags around the keywords.

The software module L2 indicates the time codes of each word, it being specified that it is always possible to configure (other types of tags that would have been defined beforehand when configuring the LO2, or even, in remote mode, during direct tagging by the author using the LO2 used in simplified mode).

Time codes (TC) specific to the audio-video file.

The editorialization method according to the present disclosure may advantageously be used by a researcher or a documentalist to carry out cross-sectional research in a set of fields of knowledge, and for any type of support and format. It is thus possible to carry out new combinations of listening to fragments of orality around the sole criterion of relevance resulting from a search by keywords or by reference documents, all while systematically maintaining the unique context specific to each oral segment consulted.

The editorialization method according to the present disclosure can also be used by learners in training and can greatly contribute to the transmission of knowledge, in particular, knowledge from experience.

In particular, in industrial knowledge environments generating large masses of technical data, the editorialization method according to the present disclosure can contribute to solving problems of transmission of knowledge. By massive processing of oral explanatory discourse associated with technical documentation, it then becomes possible to deliver accelerated and operational training in a digital context, to preserve and enhance know-how, in particular, know-how belonging to experts retiring from or leaving the company.

As will be readily understood, the present disclosure is not limited to the examples that have just been described, and numerous modifications may be made to these examples without departing from the scope of the present disclosure. In addition, the various features, forms, variants, and embodiments of the present disclosure may be grouped together in various combinations as long as they are not incompatible or mutually exclusive.

The invention claimed is:

1. A method for editorializing digital audiovisual or audio recording content of an oral presentation given by a speaker using a presentation support comprising a detailed plan of the oral presentation, the oral presentation comprising a succession of words and having been recorded in the form of a digital audiovisual file, and the presentation support being enriched with tags, the method comprising:
   generating a written transcription of the oral presentation with indication of a time code for all or part of the words, implementing a speech recognition applied to the digital audiovisual file,
   transposing the time codes from the written transcription to the tagged presentation support,
   identifying the tags and the time codes of the presentation support, and
   marking the digital audiovisual file with the tags and time codes thus identified, so as to generate an enriched digital audiovisual file.

2. The method of claim 1, further comprising implementing a list of references intended to be cited orally during the oral presentation, and wherein the presentation support is enriched with tags associated with the references prior to the oral presentation.

3. The method of claim 1, wherein the presentation support is created live by the speaker during broadcasting of an oral presentation of the speaker.

4. The method of claim 3, wherein the creation of the presentation support comprises an addition by the presenter of tags on the support.

5. The method of claim 1, wherein the tags marked on the digital audiovisual file comprise structure tags and codes containing information relating to a citation.

6. The method of claim 5, further comprising recovering the information contained in a code and exploiting this information.

7. The method of claim 1, further comprising a phase of aggregating the digital audiovisual files enriched with a plurality of knowledge environments, in a knowledge database structured in such a way as to make it accessible through a search engine.

8. The method of claim 7, further comprising a phase of generating traceability of copyrights or usage rights attached to content in the enriched presentation support and/or in the enriched digital audiovisual file and/or in a temporal database of documented orality data and/or in the knowledge environment(s).

9. The method of claim 1, wherein the identification of the tags is designed to detect simple tags before and/or after titles of a detailed presentation support outline, and/or tags before and/or after keywords or concepts within the presentation support.

10. The method of claim 1, wherein the identification of the tags is designed to detect codes in the presentation support at the location of references cited orally.

11. The method of claim 1, further comprising implementation of a graphical interface providing a user of the method with digital tools to produce, from an oral presentation, a digital presentation support that is tagged and enriched with codes, the graphical interface containing:
   a list for the choice of the main area of knowledge,
   a table of orally cited references organized by predefined categorical data,
   a table of tags of a detailed presentation support outline,
   a table of tags of keywords or concepts.

12. The method of claim 1, wherein the method is implemented in the form of an application that can be downloaded to a computer or a smartphone or any digital medium.

13. The method of claim 1, wherein the marking of the digital audiovisual file comprises emitting signals corresponding to simple structure tags implementing a method for using the digital audiovisual file, designed to transcribe, from the marked audiovisual file, a sound flow of words corresponding to a tagged segment.

14. The method of claim 13, wherein emitting signals corresponding to simple structure tags comprises transmitting a string of characters surrounded by the structure tags, titles corresponding to the character strings thus surrounded being written directly into the digital audiovisual file, in a time a time stream corresponding to their evocation.

15. The method of claim 13, characterized in that the method for using the digital audiovisual file is designed to read textual information written on the digital audiovisual file.

16. The method of claim 13, wherein emitting signals corresponding to enriched tags of type code comprises, in response to an identification of a code in the oral presentation, transmitting a signal comprising information that the code contains by associating it with its time code during a presenter's oral narrative.

17. The method of claim 16, wherein the code and the time code associated with the code are reported in a digital file provided for a structured temporal organization of the oral presentation.

18. The method of claim 13, wherein emitting signals corresponding to keyword tags comprises transmitting a signal providing a timestamp of the digital audiovisual file.

19. The method of claim 13, wherein emitting signals corresponding to keyword tags comprises transmitting a string of characters surrounded by the tags, the character string thus surrounded then being written into the digital audiovisual file, in a time stream corresponding to an evocation of the keyword during the oral presentation.

20. The method of claim 18, further comprising automatically constituting a consultation index of the keywords mentioned in the oral presentation.

21. The method of claim 18, wherein the method is implemented from a computer designed to read the digital audiovisual file once the audiovisual recording of the oral presentation has been completed.

22. The method of claim 1, further comprising a phase of processing the tagged audiovisual file of the oral presentation comprising the steps of: extracting tag and code data contained in the tagged audiovisual file, incrementing the tag and code data according to a temporal criterion in a matrix table, generating, from the matrix table, collections of data tables corresponding to predefined
categories, the data tables comprising a structure table and category tables, creating interchangeable databases on the fly from the structure table and the category tables.

23. The method of claim 1, further comprising a phase of creating one or more knowledge environments associated with the oral presentation, the creation phase comprising generating a temporal database.

24. The method of claim 23, wherein the creation phase further comprises an editorialization of oral and documentary resources extracted from the temporal database.

25. The method of claim 1, further comprising a step for excluding, from the time coding of all the words contained in the oral presentation, predetermined words for which no time code will be indicated during the transcription stage of the oral presentation.

26. A system for editorializing digital audiovisual or audio recording content of an oral presentation given by a speaker, the oral presentation implementing a presentation support comprising a detailed plan of the oral presentation and a list of references intended to be cited orally during the oral presentation, the oral presentation comprising a succession of words and having been recorded in the form of a digital audiovisual file, and the presentation support having been enriched with tags, the system comprising:
- means for transcribing the presentation with indication of a time code for all or part of the words, implementing speech recognition means applied to the digital audiovisual file,
- means for transposing the time codes of the transcription to the tagged presentation support,
- means for identifying the tags and the time codes of the presentation support, and
- means for marking the digital audiovisual file with the tags and time codes thus identified, so as to generate an enriched digital audiovisual file.

27. The system of claim 26, further comprising means for generating traceability of the copyrights or usage rights attached to content in the enriched presentation support and/or in the enriched digital audiovisual file and/or in a temporal database of documented orality data and/or in the knowledge environment(s) aggregated with the digital audiovisual file.

\* \* \* \* \*